(12) United States Patent
Chun et al.

(10) Patent No.: US 8,364,156 B2
(45) Date of Patent: Jan. 29, 2013

(54) METHOD OF CELL SELECTION IN HEIRARCHICAL CELL STRUCTURE BASED ON CELL QUALITY

(75) Inventors: Sung-Duck Chun, Gyeonggi-Do (KR); Seung-June Yi, Gyeonggi-Do (KR); Sung-Jun Park, Gyeonggi-Do (KR); Young-Dae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 743 days.

(21) Appl. No.: 12/404,625

(22) Filed: Mar. 16, 2009

(65) Prior Publication Data
US 2009/0239535 A1  Sep. 24, 2009

Related U.S. Application Data

(60) Provisional application No. 61/037,309, filed on Mar. 17, 2008, provisional application No. 61/039,095, filed on Mar. 24, 2008.

(30) Foreign Application Priority Data

Mar. 13, 2009 (KR) .................. 10-2009-0021726

(51) Int. Cl.
*H04W 40/00* (2009.01)
*H04W 4/00* (2009.01)
(52) U.S. Cl. ...................... 455/449; 455/435.1
(58) Field of Classification Search .............. 455/437, 455/436, 435.1, 525
See application file for complete search history.

(56) References Cited

U.S. PATENT DOCUMENTS
6,751,460 B2   6/2004 Korpela et al.
(Continued)

FOREIGN PATENT DOCUMENTS

| EP | 1286564 A1 | 2/2003 |
|---|---|---|
| EP | 1771024 A1 | 4/2007 |
| KR | 10-2005-0083260 A | 8/2005 |
| KR | 10-2006-0096172 A | 9/2006 |
| RU | 2006105411 A | 7/2006 |
| WO | WO 2007/088381 A1 | 8/2007 |

OTHER PUBLICATIONS

3GPP TS 25.304 V8.0.0 (Dec. 2007), 3rd Generation Partnership Project.*

(Continued)

*Primary Examiner* — Jinsong Hu
*Assistant Examiner* — William Nealon
(74) *Attorney, Agent, or Firm* — Birch, Stewart, Kolasch & Birch, LLP (57) ABSTRACT

A method of cell selection for a user equipment (UE) is provided. If a hierarchical cell structure (HCS) is used in a serving cell of the UE, a ranking procedure is performed in a first manner if the UE has low mobility, and the ranking procedure is performed if in a second manner the UE has high mobility. When the UE has low mobility, the ranking procedure is performed for all measured cells that have a highest HCS priority among those cells that fulfill a criterion S and a criterion H$\geq$0, or the ranking procedure is performed for all measured cells regardless of HCS priorities if no cell fulfills the criterion S and the criterion H$\geq$0. When the UE has high mobility, the ranking procedure is performed for all measured cells, and if there are cells with lower HCS priority than the serving cell that fulfills the criterion S and the criterion H$\geq$0, the ranking procedure is performed for all cells that have the highest HCS priority. Otherwise, if there are cells that fulfill the criterion S and the criterion H$\geq$0 with a HCS priority that is higher than or equal to the HCS priority of the serving cell, then the ranking procedure is performed for all cells that have the lowest HCS priority, else, the ranking procedure is performed for all cells regardless of HCS priorities.

15 Claims, 5 Drawing Sheets

Cell selection condition : Srxlev > 0 AND Squal > 0

Where:
Squal = Qqualmeas ? Qqualmin
Srxlev = Qrxlevmeas - Qrxlevmin - Pcompensation

| Squal | Cell Selection quality value (dB) |
|---|---|
| Srxlev | Cell Selection RX level value (dB) |
| Qqualmeas | Measured cell quality value expressed in CPICH Ec/N0 (dB) |
| Qrxlevmeas | Measured cell CPICH RSCP RX level value (dBm). |
| Qqualmin | Minimum required quality level in the cell (dB) |
| Qrxlevmin | Minimum required RX level in the cell (dBm) |
| Pcompensation | RF dependent value (dB) |

U.S. PATENT DOCUMENTS

| | | | |
|---|---|---|---|
| 7,127,253 B2 * | 10/2006 | Chen | 455/449 |
| 7,224,976 B2 | 5/2007 | Artamo et al. | |
| 2001/0031638 A1 | 10/2001 | Korpela et al. | |
| 2004/0162074 A1 | 8/2004 | Chen | |
| 2005/0090278 A1 | 4/2005 | Jeong et al. | |
| 2005/0245260 A1 * | 11/2005 | Nielsen et al. | 455/435.1 |
| 2006/0062237 A1 | 3/2006 | Kim | |
| 2006/0199591 A1 | 9/2006 | Klatt | |

OTHER PUBLICATIONS

3GPP: "3rd Generation Partnership Project; Technical Specification Group Radio Access Network; User Equipment (UE) procedures in idle mode and procedures for cell reselection in connected mode (Release 8)," 3GPP TS 25.304 V8.0.0, [Online] Dec. 2007, pp. 1-41, XP002524363, Retrieved from the Internet: URL:http://www.3gpp.org/ftp/Specs/archive/25_series/25.304/> [retrieved on Apr. 20, 2009].

LG Electronics Inc: "Correction to HCS," Discussion, Decision, 3GPP TSG-RAN WG2 #61bis, Mar. 31-Apr. 4, 2008, Shenzhen, China, 6.2, R2-081566, pp. 1-18.

Tanner et al., "WCDMA—Requirements and Practical Design", John Wiley & Sons, Ltd, 2004, p. 293 (6 pages provided).

T-Mobile, NTT DoCoMo, "Discussion on Cell Selection and Reselection Parameters", 3GPP TSG-RAN WG2 Meeting #4, Tdoc R2-050394, Feb. 14-18, 2005, 13 pages.

* cited by examiner

Cell selection condition : Srxlev > 0 AND Squal > 0

Where:
> Squal = Qqualmeas ? Qqualmin
> Srxlev = Qrxlevmeas - Qrxlevmin - Pcompensation

| | |
|---|---|
| Squal | Cell Selection quality value (dB) |
| Srxlev | Cell Selection RX level value (dB) |
| Qqualmeas | Measured cell quality value expressed in CPICH Ec/N0 (dB) |
| Qrxlevmeas | Measured cell CPICH RSCP RX level value (dBm). |
| Qqualmin | Minimum required quality level in the cell (dB) |
| Qrxlevmin | Minimum required RX level in the cell (dBm) |
| Pcompensation | RF dependent value (dB) |

$$R_s = Q_{meas,s} + Qhyst_s + Qoffmbms$$

$$R_n = Q_{meas,n} - Qoffset_{s,n} + Qoffmbms$$

$$H_s = Q_{meas,s} - Qhcs_s$$

$$H_n = Q_{meas,n} - Qhcs_n - TO_n * L_n$$

METHOD OF CELL SELECTION IN HEIRARCHICAL CELL STRUCTURE BASED ON CELL QUALITY

CROSS-REFERENCE

The present application claims priority benefit to the following applications, which contents are all incorporated by reference herein: U.S. Provisional Application Nos. 61/037,309 (filed Mar. 17, 2008), 61/039,095 (filed Mar. 24, 2008), and Korean Patent Application No. 10-2009-0021726 (filed Mar. 13, 2009).

BACKGROUND

The present invention relates to a method of cell selection in a hierarchical cell structure based on cell quality. In the related art, cell selection was performed, but radio resources were unnecessarily wasted. As such, the related art technologies do not sufficiently address such issues, and thus do not offer appropriate solutions.

SUMMARY

The present inventors recognized at least the above-identified drawbacks of the related art as a result of performing testing for out-of-service situations. Based upon such recognition, the various features described hereafter have been conceived such that a method of cell selection in a hierarchical cell structure based on cell quality is provided, which results in more efficient use of radio resources.

DETAILED DESCRIPTION

The inventive concepts and features herein related to a method of cell selection in a hierarchical cell structure based on cell quality are explained in terms of a Long Term evolution (LTE) system or other so-called 4G communication systems, which is an enhancement to current 3GPP technologies. However, such details are not meant to limit the various features described herein, which are applicable to other types of mobile and/or wireless communication systems and methods.

Hereafter, the term "mobile terminal" will be used to refer to various types of user devices, such as mobile communication terminals, user equipment (UE), mobile equipment (ME), and other devices that support various types of wireless communication technologies.

In mobile telecommunications, cell selection is the process whereby the mobile terminal searches for a suitable (candidate) cell. When a cell is selected as a result of performing cell selection, the selected cell is called a camped-on cell. When camped on a cell, the mobile terminal shall regularly search for a better cell according to various cell reselection criteria (explained hereafter) and if a better cell is found, that better cell is selected.

Typically, large cells (e.g. macro-cells) cannot support a large number of users, but can support users moving at high speed. Typically, small cells (e.g. micro-cells or pico-cells) can support a large number of users, but cannot support users moving at high speed. These problems may be solved by using a hierarchical cell structure (HCS) that defines a number of overlapping cells of different sizes that form multiple cell layers. This type of cell structure allows the network to effectively use the geographical area and serve a greater number of users.

To define which cell layer of the HCS the UE should be in, a HCS priority is defined (HCS_PRIO). Such priority information can be transmitted as part of cell broadcast information (e.g. SIB 11 and SIB 12 for neighbor cells and SIB13 and SIB14 for serving cells). For neighbor cells, such priority information can also be transmitted as part of an RRC measurement control message. The HCS cells may be given priorities from 0-7, where 0 is the lowest priority and 7 is the highest priority. The cells close to the serving cell may be given the highest priority.

The cell reselection criteria may include an H criterion (i.e. a HCS criterion, used when HCS is employed, that is a positive or negative value calculated based on information sent in system information and on measurements from the CPICH/P-CPCCH of the candidate cell), an S criterion (i.e. a selection or eligibility criterion used to check whether the received quality of the candidate cell is sufficient) and an R criterion (i.e. a ranking criterion used by the mobile terminal to rank the list of cells satisfying the criterion S).

The present invention was conceived to improve the cell selection (re-selection) procedures such that the occurrence of out-of-service situations is reduced. The so-called out-of-service situations mean that the mobile terminal cannot receive a particular service from the mobile communications network due to various reasons. To resolve an out-of-service situation, the mobile terminal would need to perform a full cell search procedure, which consumes battery power and causes delays that the user may notice.

The procedures for cell selection (reselection) employ various conditions including the H criterion and the S criterion. The present inventors recognized that the related art cell selection (reselection) procedure has some drawbacks. This was because the related art primarily considers the H criterion, and then later considers the S criterion as a secondary condition or even ignores the S criterion. Based upon this problem recognition, the present invention puts more emphasis and importance on the S criterion than the H criterion, which results in improved cell selection and re-selection.

The present invention relates to a method of selecting a cell from which the mobile terminal receives a service in UMTS (Universal Mobile Telecommunications System), which is the European type IMT-2000 system. In particular, the present invention relates to a method for a mobile terminal to consider the quality of each of a plurality of cells when selecting the particular cell in which its service is to be received.

Figure 1:
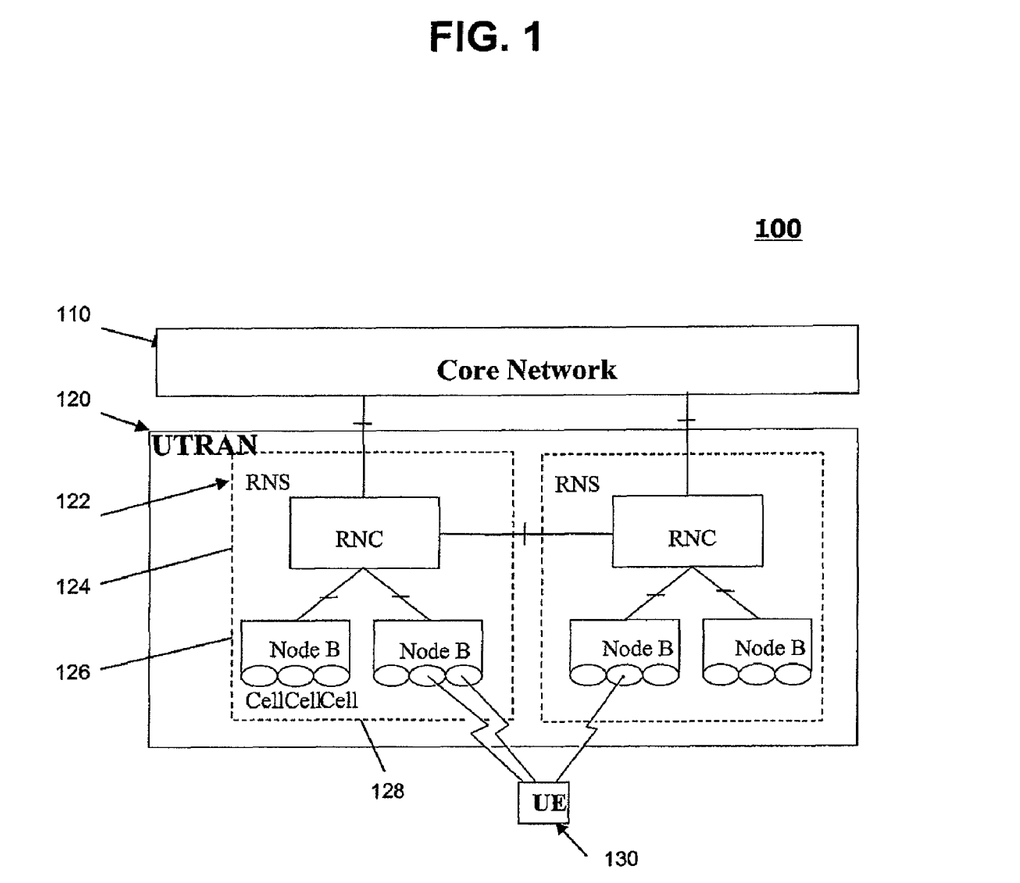
FIG. 1 shows an exemplary network architecture of a Universal Mobile Telecommunications System (UMTS).

FIG. 1 shows the network architecture of a Universal Mobile Telecommunications System (UMTS) 100. The UMTS system is basically comprised of user equipment (UEs) 130, a UMTS Terrestrial Radio Access Network (UTRAN) 120, and a core network (CN) 110. The UTRAN 120 has one or more radio network sub-systems (RNS) 122, and each RNS has a radio network controller (RNC) 124, and one or more Node Bs 126 that are managed by the RNC 124. One or more cells 128 exist for a Node B.

Figure 2:
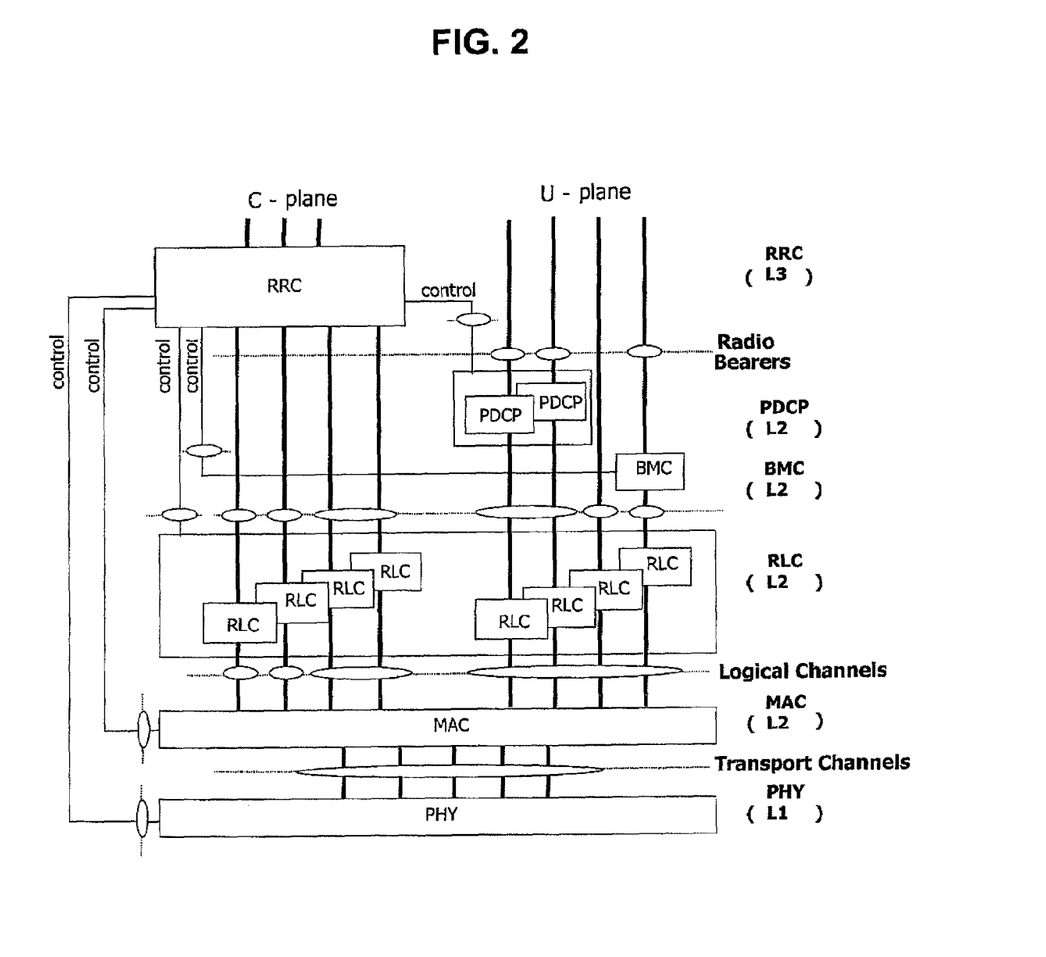
FIG. 2 shows an exemplary radio protocol stack used in UMTS.

FIG. 2 shows the radio protocol stack used in UMTS. The radio protocol layers exist in pairs in the mobile terminal and in the UTRAN, and handle data transmission over the radio interface. This radio protocol stack is largely divided into three layers: L1 (Layer 1), L2 (Layer 2) and L3 (Layer 3).

L1 (Layer 1) has the physical layer (PHY) that uses various types of radio transmission techniques to transmit data with reliability over the radio interface. The PHY layer is connected to an upper layer (the MAC layer) via transport channels, which can be divided into dedicated transport channels and common transport channels.

L2 (Layer 2) is comprised of four sub-layers: MAC, RLC, PDCP and BMC, each of which will be described in more detail below.

The MAC (Media Access Control) layer performs mapping of various logical channels to various transport channels, and also performs logical channel multiplexing of multiple logical channels to a single transport channel. The MAC layer is connected with an upper layer (the RLC layer) via one or more logical channels. Based on the type of information that is transmitted, these logical channels can be divided into control channels used to transmit control plane information and traffic channels used to transmit user plane information. Based on the types of transport channels that are managed, the MAC layer can be divided into a MAC-b sub-layer, a MAC-c/sh sub-layer, a MAC-d sub-layer, a MAC-hs sub-layer, and a MAC-e sub-layer. The MAC-b sub-layer handles the management of a BCH (Broadcast CHannel) used to broadcast system information. The MAC-c/sh sub-layer manages shared transport channels, such as the FACH (Forward Access CHannel), the DSCH (Downlink Shared CHannel), and the like, which are shared with other mobile terminals. The MAC-d sub-layer handles the management of dedicated transport channels, such as the DCH (Downlink Shared Channel), with respect to a particular mobile terminal. In order to support high-speed data transmissions on the downlink and uplink, the MAC-hs sub-layer manages the HS-DSCH (High Speed Downlink Shared CHannel), which is a transport channel for transmitting high-speed downlink data. The MAC-e sub-layer manages the E-DCH (Enhanced Dedicated CHannel), which is a transport channel for high speed uplink data transmissions.

The RLC (Radio Link Control) layer handles the guarantee of the quality of service (QoS) of each radio bearer (RB) and the transmission of data thereof. For the RLC to guarantee the QoS that is unique to the RB, one or two independent RLC entities exist for each RB, and three types of RLC modes (TM: transparent Mode; UM: Unacknowledged Mode; AM: Acknowledged Mode) are provided to support the various QoS. Also, the RLC adjusts the size of data to be appropriate for transmission over the radio (air) interface by a lower layer, and performs the functions for segmentation and concatenation of the data received from an upper layer.

The PDCP (Packet Data Convergence Protocol) layer is located above the RLC layer and allows the data to be transmitted using IP packets (such as IPv4 or IPv6) over the radio (air) interface having relatively small bandwidth in an effective manner. To do so, the PDCP layer performs a header compression function, which allows transmission of data that is only necessary in the header portion of data such that transmission efficiency over the radio (air) interface is increased. The PDCP layer only exists in the PS (Packet Switched) domain because header compression is a basic function, and one PDCP entity exists per RB in order to effectively provide header compression functions with respect to each PS service.

The BMC (Broadcast/Multicast Control) layer exists above the RLC layer and performs the functions related to scheduling of cell broadcast messages and broadcasting to mobile terminals located in a particular cell.

L3 (Layer 3) has the RRC (Radio Resource Control) layer, located at the lowermost portion there of, that is defined only in the control plane, for controlling parameters of L1 and L2 with respect to the establishment, re-establishment and release of radio bearers, as well as controlling the logical channels, transport channels and physical channels. Here, a radio bearer refers to a logical path that is provided by L1 and L2 of the radio protocol for data transfer between the mobile terminal and the UTRAN. In general, establishment of the radio bearer refers to a procedure of setting the characteristics of the radio protocol layers and channels needed for providing a particular service, and then setting each particular parameter and operation methods thereof.

A procedure for selecting a cell by a mobile terminal in idle mode will be explained in detail.

Basically, the reason for selecting a cell is to register with the network in order to receive a service from the base station. Here, if the strength or quality of signals between the mobile terminal and base station would be reduced because of the mobility of the mobile terminal, in order to maintain the transmission quality of data, the mobile terminal re-selects a different cell. Hereafter, the characteristics of physical signals such as signal strength and noise-to-interference ratio will simply be referred to as signal characteristics.

As described above, there is a method of selecting a cell based on signal characteristics according to the radio environment. The mobile terminal may also need to use a cell selection procedure based on the following reasons: UE capability, subscriber information, camp load balancing, traffic load balancing, etc.

Hereafter, a method and procedures for selecting a cell in WCDMA will be described.

Figure 3:
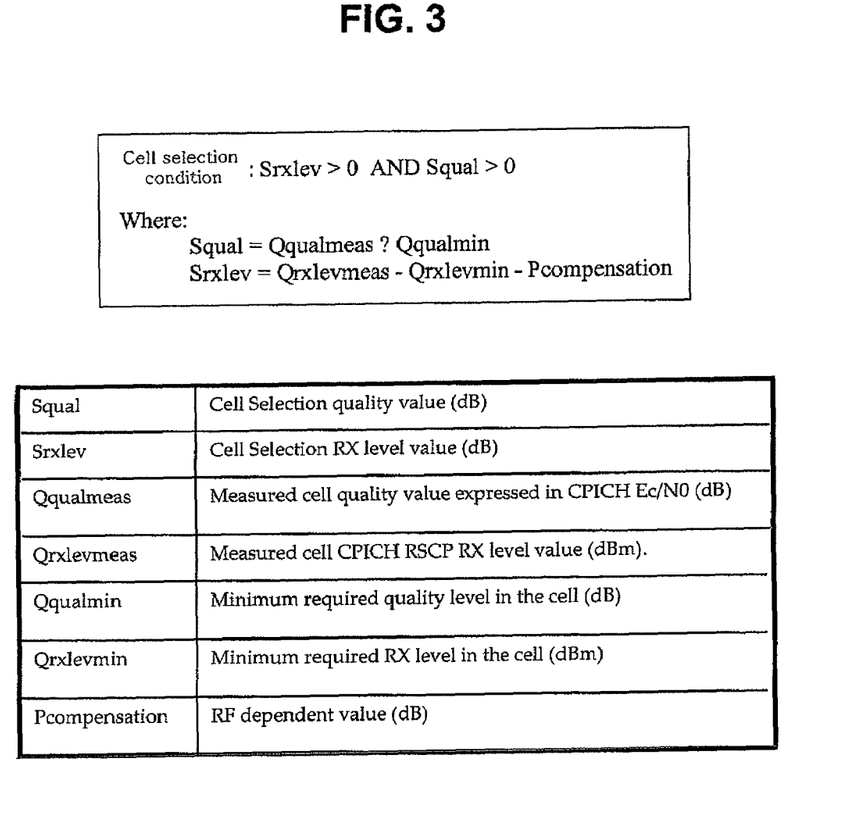
FIG. 3 shows exemplary equations that define the conditions used by the mobile terminal to select the cell having a signal strength and quality that are greater than the particular values defined by the system.

When the mobile terminal is first turned on (or powered up), the PLMN and RAT are selected for radio communications, and the mobile terminal performs signal measurement procedures with the base station in all searchable frequency bands, and then the cell having the strongest signal characteristics value is selected among the cells that satisfy the conditions in FIG. 3 and access thereto is performed. In the WCDMA system, the CPICH RSCP, CPHIC Ec/N0 and Carrier RSSI are used as the values for the above signal measurement procedures.

In FIG. 3, it can be understood that the mobile terminal selects the cell having a signal strength and quality that are greater than the particular values defined by the system (Strength: Qrxlevmin+Pcompensation, Quality: Qqualmin). Here, these values (Qrxlevmin, Pcompensation, Quality: Qqualmin) are informed from the base station to the mobile terminal through system information (SI). Also, the mobile terminal waits in idle mode in order to request a service to the network (such as to perform an originating call) or to receive a service from the network (such as a terminating call). The mobile terminal in idle mode measures the signals of the cell it currently receives a service from and the signals from neighboring cells, and repeats the procedures for re-selecting cells that have better signal characteristics.

Figure 4:
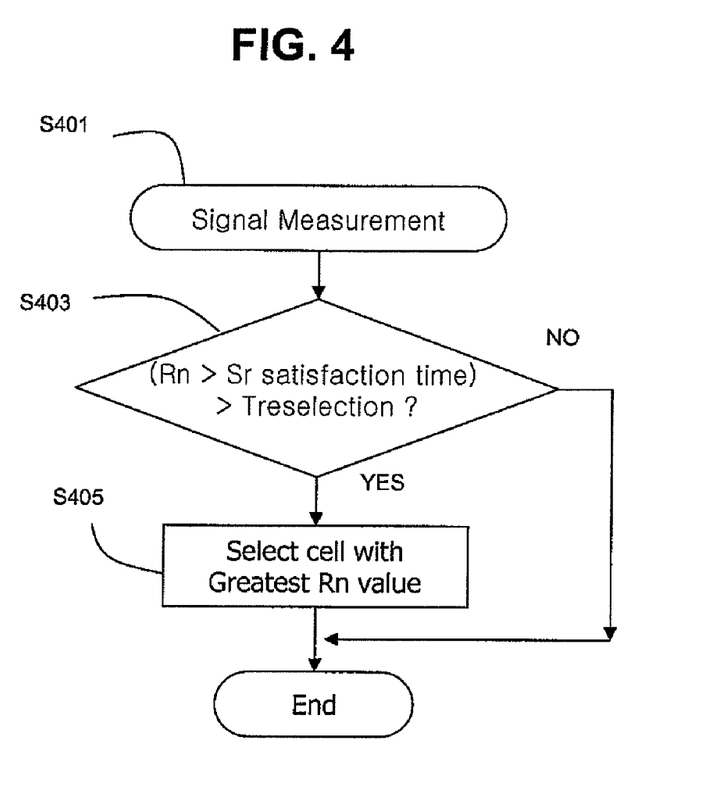
FIG. 4 shows a flow chart of an exemplary cell selection (re-selection) method in WCDMA.

FIG. 4 shows a flow chart of an exemplary cell selection (re-selection) method in WCDMA. A mobile terminal in idle mode periodically performs a measurement procedure such that with respect to signal characteristic values (Rs) of the cell from which service is being received and signal characteristic values (Rn) of neighboring cells, among the cells that satisfy the conditions of FIG. 3, as shown in step S401. If the condition of Rn>Rs is satisfied during a particular time (Treselection), the signal strengths and qualities of the cells corresponding to Rn are compared through the use of a ranking procedure or process, as shown in step S403. As a result, the cell having the highest (or greatest) characteristic value is selected, as shown in step S405. Namely, a different cell, which has the best signal characteristics compared to the cell from which service is currently being received, is selected.

Figure 5:
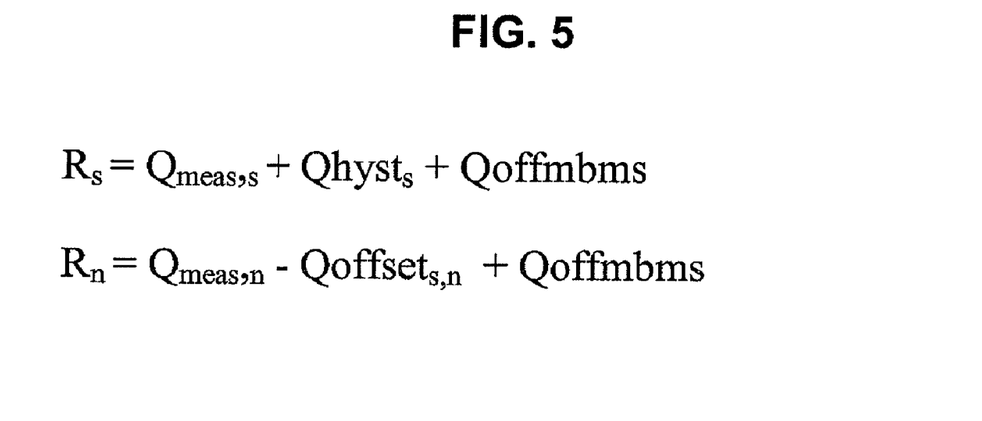
FIG. 5 shows the equations for calculating the R criterion values used by the mobile terminal for the ranking process among cells.

The values of Rs and Rn are obtained through use of the equations in FIG. 5. Treselection is a value that the base station informs to the mobile terminal via system information (SI), and is used to prevent a particular cell from being repeatedly selected by applying a restriction that the cell selection conditions should be satisfied for more than a certain amount of time.

FIG. 5 shows the equations for calculating the R criterion values used by the mobile terminal for the ranking process among cells. Here, Rs represents the serving cell ranking and Rn represents the neighbor cell ranking. Qmeas,s signifies the CPICH Ec/N0 value measured with respect to a cell from which service is being received, and Qmeas,n signifies the CPICH Ec/N0 value measured at the mobile terminal with respect to neighboring cells. The value $Qhyst_s$ is used in order for the mobile terminal to apply a weighting value with respect to the service being currently received, while the value $Qoffset_{s,0}$ is used to reduce the bias between the cell currently being accessed and the cell to which access is to be changed or the value Qoffmbms is used to apply a weighting value with respect to a cell that supports point-to-multipoint services (such as MBMS).

Similar to the cell selection method of WCDMA, a cell selection method based on signal characteristics allows a mobile terminal to select a cell with good signal reception characteristics for receiving services from the base station such that the signals sent by a transmitter can be interpreted by the receiver with minimal errors. With respect to cells that can be selected, the R criterion values are obtained, and then ranking is performed such that the cell having the best signal characteristics is selected (or re-selected) through such ranking process.

However, in WCDMA, if a hierarchical cell structure (HCS) function is needed, such can be used.

Figure 6:
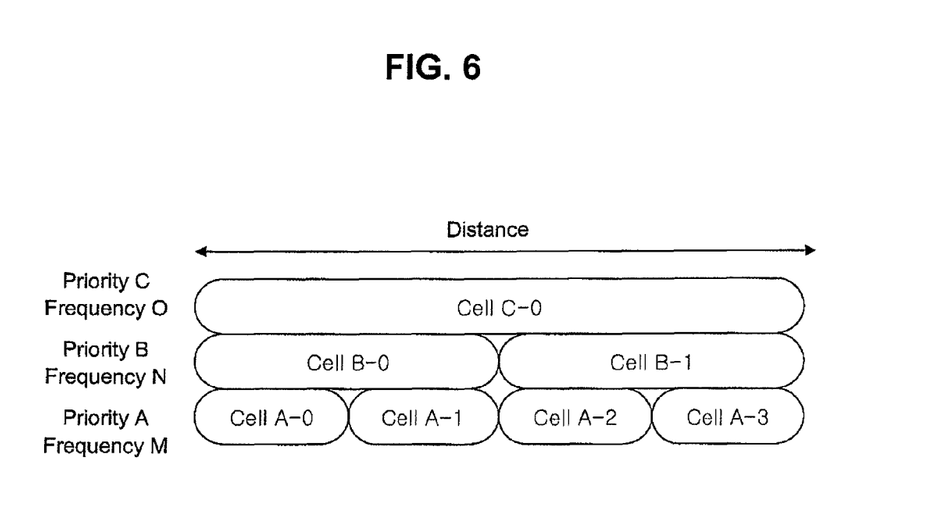
FIG. 6 shows the concept of an exemplary hierarchical cell structure (HCS).

FIG. 6 shows an example of a cell structure for HCS. Namely, multiple cells may exist in one region (or area), whereby the diameter (or other dimensions) of each cell are different. In FIG. 6, the frequencies O, N and M may be the same or different, and depicts merely one example. Also, in FIG. 6, the cells having Priority C are those having the largest diameter, while cells having Priority A have the lowest priority.

The HCS as described in FIG. 6 may be used, for example, to reduce the changes due to the mobile terminal moving at different speeds between cells. For example, assume that there is mobile terminal A and mobile terminal B moving from right to left in FIG. 6, with mobile terminal A moving at 5 km/h and mobile terminal B moving at 50 km/h. If these two mobile terminals both select cells with priority A, it can be understood that mobile terminal B needs to change cells 10 times more often than mobile terminal A during a given time period. When a mobile terminal needs to change cells often, power consumption and radio resources are wasted due to frequent cell updates being performed. Thus, in such situations, the base station makes the mobile terminals having high speed to select Priority C cells (namely, cells having large diameter), while mobile terminal having low speed to select Priority A cells (namely, cells having small diameter), which results in more effective operations for the mobile terminals.

Figure 7:
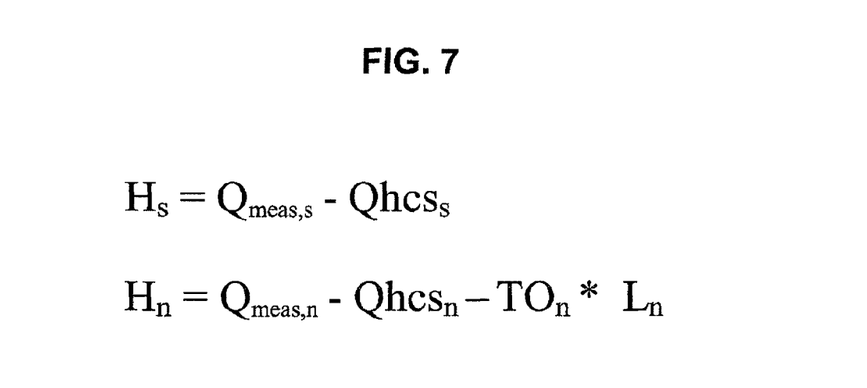
FIG. 7 shows exemplary calculation procedures of the H criterion values.

In these situations, when HCS features are used, the mobile terminal operation needs to be varied. FIG. 7 shows the calculation procedures of the H criterion values. Thus, when HCS is used, the cell selection procedure is as follows:

1. If the current serving cell indicates that HCS is being used, the mobile terminal determines the cells that fall under the following conditions:

a. When the mobile terminal moves at low speed:

i. Among the cells that satisfy H>=0, all measured cells having the highest HCS_PRIO value ii. If no cell satisfies H>=0, all measured cells regardless of the HCS_PRIO values b. When the mobile terminal moves at high speed:

i. Among the cells that satisfy H>=0, when there is a cell having a lower HCS priority than the current serving cell (Condition 1):

1. Among the cells having lower HCS priority than the current serving cell, all measured cells having the highest HCS_PRIO values among the cells that satisfy H>=0.

ii. In other cases (i.e. when Condition 1 is not satisfied):

1. Among the cells having an HCS priority that is the same as or higher than that of the current serving cell, if any cell satisfies H>=0 (Condition 2):

a. Among the cells having an HCS priority that is the same as or higher than that of the current serving cell, the cells having the lowest HCS_PRIO value among all measured cells that satisfy H>=0

2. In other cases (i.e. when Condition 2 is not satisfied)

a. All measured cells without considering HCS priority

2. For the cells determined in the above procedure 1., among the cells that satisfy the S criterion, the mobile terminal performs a ranking process based on the R criterion and selects the cell(s) with the best quality and cell selection (re-selection) to that cell is performed.

In the above explanation, the mentioned S criterion is used by the mobile terminal to determine whether or not various cells satisfy the minimum quality guarantee conditions. Namely, the S criterion is used to decide whether a particular cell satisfies the minimum conditions needed in performing paging or RRC connection.

The cell reselection procedure of the mobile terminal when HCS is set was explained above, and according to such procedure, situations can occur where the mobile terminal is not able to select a cell on which camping is possible, and thus cannot properly receive services. For example, the following cell structure can be considered.

TABLE 1

| Cell structure embodiment 1 | | | |
|---|---|---|---|
| Cell | H Criterion | S Criterion | HCS_PRIO |
| A | Satisfied | Not Satisfied | 4 |
| B | Not Satisfied | Satisfied | 4 |
| C | Satisfied | Satisfied | 3 |

According to the related art, the mobile terminal performs the following:
STEP 1: Perform necessary measurements.
 Cell A, Cell B and Cell C are measured
STEP 2: Check whether there is any cell that fulfils the criterion H>=0.
 Cell A and Cell C satisfy H criterion.
STEP 3: Identify the highest HCS_PRIO among the cells checked in step 2.
 Between Cell A and Cell C, Cell A has the highest HCS_PRIO which is 4.
STEP 4: Identify cells with the HCS_PRIO identified in step 3.
 Cell A is the only cell with the highest HCS_PRIO.
STEP 5: Check cells that satisfies S criterion among the cells identified in step 4.
 Cell A does not satisfy S criterion.
STEP 6: Perform ranking among the cells identified in step 5.
 There is no candidate cell for ranking.

In the above Table 1, the mobile terminal should select Cell C, but in the related art, the mobile terminal cannot select any of the cells. Namely, in the related art, the mobile terminal first selects the cell(s) that satisfies the H criterion and the selects the best cell among the cells that satisfy the S criterion. Thus, in the procedure of operating according to the H criterion, if there is a cell that does not satisfy the S criterion but satisfies the H criterion, there may be a problem of the mobile terminal setting an inappropriate HCS PRIO value. In such case, the mobile terminal cannot find a cell from which service is to be received, and the problem of not being able to begin or receive a call can occur.

Thus, for a system that uses the HCS function, the present invention provides a method for a mobile terminal that appropriately performs effective transmission, via a PS network or a radio protocol that supports only a PS service, of data generated in a cell from which service provision will be received For this, during the procedure for selecting the cell from which service is to be received, and in particular when the currently serving cell informs that it is using HCS, it is proposed that the mobile terminal consider the S criterion when making a list of selectable cells using the H criterion with respect to the cells that the mobile terminal should perform measurements on.

In the present invention, when applying the H criterion by the mobile terminal, the cells to which the H criterion is applied are those cells which already satisfy the S criterion.

In the present invention, upon applying the H criterion by the present invention, if each cell satisfies the H criterion, an additional check is made to see if the S criterion is also satisfied, and a ranking process is performed for those cells that satisfy the H criterion as well as the S criterion.

Next, an example of the mobile terminal operation of the present invention will be explained. When HCS is used, the cell selection procedure is as follows:
1. With respect to the cell for which measurements have been performed, the mobile terminal determines which cells satisfy the S criterion. Also, the following step 2 is performed on only these determined cells.
2. Among the cells that satisfy the above step 1, namely, among the cells that satisfy the S criterion, the mobile terminal determines the cells that satisfy the following additional conditions.
 a. When the mobile terminal moves at low speed:
  i. Among the cells that satisfy H>=0, all measured cells having the highest HCS_PRIO value
  ii. If no cell satisfies H>=0, all measured cells regardless of the HCS_PRIO values
 b. When the mobile terminal moves at high speed:
  i. Among the cells that satisfy H>=0, when there is a cell having a lower HCS priority than the current serving cell (Condition 1):
   1. Among the cells having lower HCS priority than the current serving cell, all measured cells having the highest HCS_PRIO values among the cells that satisfy H>=0.
  ii. In other cases (i.e. when Condition 1 is not satisfied):
   1. Among the cells having an HCS priority that is the same as or higher than that of the current serving cell, if any cell satisfies H>=0 (Condition 2):
    a. Among the cells having an HCS priority that is the same as or higher than that of the current serving cell, the cells having the lowest HCS_PRIO value among all measured cells that satisfy H>=0
   2. In other cases (i.e. when Condition 2 is not satisfied)
    a. All measured cells without considering HCS priority
3. Among the cells determined through step 2 above, the mobile terminal performs a ranking process according to the R criterion, selects the cell having the best quality, and performs cell selection (re-selection) to that cell.

When HCS is used, a cell selection procedure according to another embodiment of the present invention is as follows.
1. In case the current serving cell informs that it uses HCS, the mobile terminal determines the cells that satisfy the following conditions:
 a. When the mobile terminal moves at low speed:
  i. Among the cells that satisfy H>=0 and satisfy the S criterion, all measured cells having the highest HCS_PRIO value
  ii. If no cell satisfies H>=0 and also satisfies the S criterion, all measured cells that satisfy the S criterion regardless of the HCS_PRIO values
 b. When the mobile terminal moves at high speed:
  i. Among the cells that satisfy H>=0 and satisfy the S criterion, when there is a cell having a lower HCS priority than the current serving cell (Condition 1):
   1. Among the cells having lower HCS priority than the current serving cell, all measured cells having the highest HCS_PRIO values among the cells that satisfy H>=0 and also satisfy the S criterion.
  ii. In other cases (i.e. when Condition 1 is not satisfied):
   1. Among the cells having an HCS priority that is the same as or higher than that of the current serving cell, if any cell satisfies H>=0 and also satisfies the S criterion (Condition 2):
    a. Among the cells having an HCS priority that is the same as or higher than that of the current serving cell, the cells having the lowest HCS_P-RIO value among all measured cells that satisfy H>=0 and also satisfy the S criterion
   2. In other cases (i.e. when Condition 2 is not satisfied)
      a. All measured cells that satisfy the S criterion without considering HCS priority
2. For the cells determined in the above step 1., the mobile terminal performs a ranking process based on the R criterion, and selects the cell(s) with the best quality, and cell selection (re-selection) to that cell is performed.

For the example shown in Table 1 above, the operation results of the present invention can be described as follows:
STEP 1: Perform necessary measurements.
   Cell A, Cell B and Cell C are measured.
STEP 2: Check whether there is any cell that fulfils the criterion S criterion.
   Cell B and Cell C satisfy the S criterion.
STEP 3: Check whether there is any cell that fulfils the criterion H>=0 among the cells checked in step 2.
   Between Cell B and Cell C, Cell C satisfies the H criterion.
STEP 4: Identify the highest HCS_PRIO among the cells checked in step 3.
   Cell C has the highest HCS_PRIO which is 3.
STEP 5: Identify cells with the HCS_PRIO identified in step 4.
   Cell C is the only cell with the highest HCS_PRIO.
STEP 6: Perform ranking among the cells identified in step 5.
   Cell C is the candidate cell for ranking.

The results of the present invention are as follows. As described thus far, for a cell structure that employs the HCS function, the mobile terminal performs cell selection, whereby the H criterion and the S criterion are appropriately used, such that the mobile terminal can be provided with services in a more stable and efficient manner.

Some more details about the concepts and features of the present invention will be explained as follows:

Details #1

If HCS is not used in the serving cell the UE shall perform ranking of all cells that fulfill the criterion S, among:
   all measured cells If HCS is used in the serving cell the UE shall perform ranking of all cells that fulfill the criterion S among
   1. when in low-mobility
      all measured cells, that have the highest HCS_PRIO among those cells that fulfil the criterion H>=0.
      all measured cells, not considering HCS priority levels, if no cell fulfils the criterion H>=0.

According to the above, if the UE is in low-mobility and there is a cell with H>=0, the UE takes following steps:
STEP 1: Perform necessary measurements.
STEP 2: Check whether there is any cell that fulfils the criterion H>=0.
STEP 3: Identify the highest HCS_PRIO among the cells checked in step 2.
STEP 4: Identify cells with the HCS_PRIO identified in step 3.
STEP 5: Check cells that satisfies S criterion among the cells identified in step 4.
STEP 6: Perform ranking among the cells identified in step 5.

The procedure generally works with a scenario where a cell with highest HCS_PRIO and H>=0 satisfy the criterion S. But if a cell with highest HCS_PRIO and H>=0 does not satisfy the criterion S, the UE can not select any cell.

An example of cells (A, B, C) and their characteristics may be as follows:

| Cell | H Criterion | S Criterion | HCS_PRIO |
| --- | --- | --- | --- |
| A | Satisfied | Not Satisfied | 4 |
| B | Not Satisfied | Satisfied | 4 |
| C | Satisfied | Satisfied | 3 |

The following may result, after applying above steps:
STEP 1: Perform necessary measurement.
   Cell A, B and C is measured.
STEP 2: Check whether there is any cell that fulfils the criterion H>=0.
   Cell A and C satisfy H criterion.
STEP 3: Identify the highest HCS_PRIO among the cells checked in step 2.
   Between A and C, A has the highest HCS_PRIO which is 4.
STEP 4: Identify cells with the HCS_PRIO identified in step 3.
   Cell A is the only cell with the highest HCS_PRIO.
STEP 5: Check cells that satisfies S criterion among the cells identified in step 4.
   Cell A does not satisfy S criterion.
STEP 6: Perform ranking among the cells identified in step 5.
   There is no candidate cell for ranking.

Thus, in above scenario, although there are cells that satisfy the S criterion, there is no cell in the ranking list. This leads to a problem because the UE cannot reselect to a best quality cell.

The related art is generally described with the assumption that there are always cells to rank, and does not specify anything for the case when there is no cell to rank. So, the UE behavior after the STEP 6 in above scenario is not clear. Accordingly, this may cause un-unified UE behavior. Following interpretations can be considered.

Option 1: After noticing that there is no cell to rank as a result of step 6, the UE declares that there is "no network." And eventually, the UE performs initial cell selection, leading to long interruption time.

Option 2: The UE does nothing. I.e., because there is no cell to rank, the UE keeps camping on the current serving cell. But this is questionable because serving cell is normally considered in candidate cells for ranking process. And until the S criterion is not met for serving, the UE keeps camping on the not-best cell.

One way to correct such problem is for the UE to consider both the H criterion and also the S criterion when choosing candidates cells for ranking. By doing so, the situations where there is no candidate cell for raking even when there are cells that satisfies S criterion may be advantageously avoided.

Details #2

Understanding A

According to specification stated above, the first possible implementation is that a UE first checks H criterion and check the S criterion later.

In this implementation, if the UE is in low-mobility and there is a cell with H>=0, UE takes following steps:
STEP 1: Perform necessary measurement.
STEP 2: Check whether there is any cell that fulfils the criterion H>=0.
STEP 3: Identify the highest HCS_PRIO among the cells checked in step 2.
STEP 4: Identify cells with the HCS_PRIO identified in step 3.

STEP 5: Check cells that satisfies S criterion among the cells identified in step 4.
STEP 6: Perform ranking among the cells identified in step 5.
  Understanding B
  Another possible implementation is that a UE first checks S criterion and check the H criterion later.
  In this implementation, if the UE is in low-mobility and there is a cell with H>=0, UE takes following steps:
STEP 1: Perform necessary measurement.
STEP 2: Check whether there is any cell that fulfils the criterion S criterion.
STEP 3: Check whether there is any cell that fulfils the criterion H>=0 among the cells checked in step 2.
STEP 4: Identify the highest HCS_PRIO among the cells checked in step 3.
STEP 5: Identify cells with the HCS_PRIO identified in step 4.
STEP 6: Perform ranking among the cells identified in step 5.
  Hereafter, we analyze the UE behavior according to the above understandings A and B. The following example scenario can be considered:

| Cell | H Criterion | S Criterion | HCS_PRIO |
|------|-------------|-------------|----------|
| A    | Satisfied   | Not Satisfied | 4      |
| B    | Not Satisfied | Satisfied | 4        |
| C    | Satisfied   | Satisfied   | 3        |

Cell Reselection Following Understanding A
According to the procedure described above, the following steps may occur:
STEP 1: Perform necessary measurement.
  Cell A, B and C is measured.
STEP 2: Check whether there is any cell that fulfils the criterion H>=0.
  Cell A and C satisfy H criterion.
STEP 3: Identify the highest HCS_PRIO among the cells checked in step 2.
  Between A and C, A has the highest HCS_PRIO which is 4.
STEP 4: Identify cells with the HCS_PRIO identified in step 3.
  Cell A is the only cell with the highest HCS_PRIO.
STEP 5: Check cells that satisfies S criterion among the cells identified in step 4.
  Cell A does not satisfy S criterion.
STEP 6: Perform ranking among the cells identified in step 5.
  There is no candidate cell for ranking.
  Cell Reselection Following Understanding B
According to the procedure described above, the following steps may occur:
STEP 1: Perform necessary measurement.
  Cell A, B and C is measured
STEP 2: Check whether there is any cell that fulfils the criterion S criterion.
  Cell B and C satisfy S criterion.
STEP 3: Check whether there is any cell that fulfils the criterion H>=0 among the cells checked in step 2.
  Between B and C, C satisfies H criterion.
STEP 4: Identify the highest HCS_PRIO among the cells checked in step 3.
  C has the highest HCS_PRIO which is 3.
STEP 5: Identify cells with the HCS_PRIO identified in step 4.
  Cell C is the only cell with the highest HCS_PRIO.

STEP 6: Perform ranking among the cells identified in step 5.
  Cell C is the candidate cell for ranking.
  Correction of the Different Behaviors
  When we look at the scenarios above, it is evident that there is a candidate cell for the UE to camp on. The cell C satisfies both the H criterion and S criterion. However, there is a cell to rank in understanding B, but there is no cell to rank in understanding A. The behavior of understanding A results in a problem because the UE can not reselect to any relevant cell. The UE may declare "no network" and begins a full search, leading to a long interruption time.
  The main problem of the implementation A is that the S criterion is not properly considered in the selection of the highest HCS_PRIO value. (i.e., a cell which does not satisfy the S criterion but satisfies the H criterion affects the decision process of the highest HCS_PRIO). Thus, the related art procedures should be corrected such that the S criterion is also considered in the steps related to the H criterion.
  Proposal 1: A Cell Satisfying the S Criterion is Considered in the Process Related to the H Criterion.
  The above is generally described with the assumption that there are always some cells to rank. However, the related art does not specify anything for the case when there is no cell to rank. Thus, the UE behavior when there is no cell to rank is not clear. Accordingly, this may cause non-unified UE behavior.
  Proposal 2: It is Proposed to Discuss Whether there is a Need to Specify Any Details for the Case when there is No Cell to Rank.
  The easiest way to correct such problem is that the UE considers both the H criterion and S criterion when choosing candidate cells for ranking. By doing so, we can prevent the case where there is no candidate cell for raking even when there are cells that satisfy the S criterion.
Cell Reselection Evaluation Process
Cell Reselection Criteria
  The following cell re-selection criteria are used for intra-frequency cells, inter-frequency cells and inter-RAT cells:
  The quality level threshold criterion H for hierarchical cell structures is used to determine whether prioritized ranking according to hierarchical cell re-selection rules shall apply, and is defined by:

$$H_s = Q_{meas,s} - Qhcs_s$$

$$H_n = Q_{meas,n} - QhcS_n - TO_n * L_n$$

If it is indicated in system information (SI) that HCS is not used, the quality level threshold criterion H is not applied.
The cell-ranking criterion R is defined by:

$$R_s = Q_{meas,s} + Qhyst_s + Qoffmbms$$

$$R_n = Q_{meas,n} - Qoffset_{s,n} + Qoffmbms - TO_n*(1-L_n)$$

where: the signaled value Qoffmbms is only applied to those cells (serving or neighboring cells) belonging to the MBMS PL, and
where:

$$TO_n = TEMP\_OFFSET_n * W(PENALTY\_TIME_n - T_n)$$

$$L_n = 0 \text{ if HCS\_PRIO}_n = \text{HCS\_PRIO}_s$$

$$L_n = 1 \text{ if HCS\_PRIO}_n <> \text{HCS\_PRIO}_s$$

$$W(x) = 0 \text{ for } x < 0$$

$$W(x) = 1 \text{ for } x >= 0$$

TEMP_OFFSETn applies an offset to the H and R criteria for the duration of PENALTY_TIMEn after a timer Tn has started for that neighboring cell.

TEMP_OFFSETn and PENALTY_TIMEn are only applicable if the usage of HCS is indicated in system information.

The timer Tn is implemented for each neighboring cell. Tn shall be started from zero when one of the following conditions becomes true:

if HCS_PRIOn<>HCS_PRIOs and
   Qmeas,n>=Qhcsn

Or if HCS_PRIOn=HCS_PRIOs and
   for serving FDD and neighbor FDD cells if the quality measure for cell selection and reselection is set to CPICH RSCP in the serving cell, and:

$$Q_{meas,n} > Q_{meas,s} + Qoffset1_{s,n}$$

for serving FDD and neighbor FDD cells if the quality measure for cell selection and reselection is set to CPICH Ec/No in the serving cell, and:

$$Q_{meas,n} > Q_{meas,s} + Qoffset2_{s,n}$$

for all other serving and neighbor cells:

$$Q_{meas,n} > Q_{meas,s} + Qoffset1_{s,n}$$

Tn for the associated neighbor cell shall be stopped as soon as any of the above conditions are no longer fulfilled. Any value calculated for TOn is valid only if the associated timer Tn is still running; else TOn shall be set to zero.

At cell-reselection, a timer Tn is stopped only if the corresponding cell is not a neighbor cell of the new serving cell, or if the criteria given above for starting timer Tn for the corresponding cell is no longer fulfilled with the parameters of the new serving cell. On cell re-selection, timer Tn shall continue to be run for the corresponding cells, but the criteria given above shall be evaluated with parameters broadcast in the new serving cell if the corresponding cells are neighbors of the new serving cell.

| | |
|---|---|
| $S_n$ | Cell Selection value of the neighbouring cell, (dB) |
| $Q_{meas}$ | Quality value. The quality value of the received signal derived from the averaged CPICH Ec/No or CPICH RSCP for FDD cells, from the averaged P-CCPCH RSCP for TDD cells and from the averaged received signal level for GSM cells. The averaging of these measurement quantities are performed as specified in [10] and [11]. For FDD cells, the measurement that is used to derive the quality value is set by the Cell_selection_and_reselection_quality_measure information element. |

Cell reselection parameters broadcast in system information can be provided.

The cell selection criterion S used for cell reselection is fulfilled when:

| | |
|---|---|
| for FDD cells: | Srxlev > 0 AND Squal > 0 |
| for TDD cells: | Srxlev > 0 |
| for GSM cells: | Srxlev > 0 |

Where:

$$Squal = Q_{qualmeas} - Qqualmin$$

$$Srxlev = Q_{rxlevmeas} - Qrxlevmin - Pcompensation$$

| | |
|---|---|
| Squal | Cell Selection quality value (dB) Applicable only for FDD cells. |
| Srxlev | Cell Selection RX level value (dB) |
| $Q_{qualmeas}$ | Measured cell quality value. The quality of the received signal expressed in CPICH $E_c/N_0$ (dB) for FDD cells. CPICH Ec/N0 shall be averaged as specified in [10]. Applicable only for FDD cells. |
| $q_{rxlevmeas}$ | Measured cell RX level value. This is received signal, CPICH RSCP for FDD cells (dBm), P-CCPCH RSCP for TDD cells (dBm) and the averaged received signal level as specified in [10] for GSM cells (dBm). CPICH RSCP, P-CCPCH RSCP and the received signal level for GSM cells shall be averaged as specified in [10] and [11]. |
| Qqualmin | Minimum required quality level in the cell (dB). Applicable only for FDD cells. |
| Qrxlevmin | Minimum required RX level in the cell (dBm) |
| Pcompensation | max(UE_TXPWR_MAX_RACH - P_MAX, 0) (dB) |
| UE_TXPWR_MAX_RACH | Maximum TX power level an UE may use when accessing the cell on RACH (read in system information) (dBm) |
| P_MAX | Maximum RF output power of the UE (dBm) |

If HCS is not used in the serving cell the UE shall perform ranking of all cells that fulfill the criterion S, among:
   all measured cells.

If HCS is used in the serving cell the UE shall perform ranking of all cells among
1. when in low-mobility,
   all measured cells, that have the highest HCS_PRIO among those cells that fulfil the criterion H>=0 and fulfil the criterion S.
   all measured cells that fulfil the criterion S, not considering HCS priority levels, if no cell fulfil both the criterion H>=0 and the criterion S.
2. when in high-mobility
   all measured cells, and among these cells:
     if there are cells with a lower HCS priority than the serving cell that fulfil both the criterion H>=0 and the criterion S:
       from the cells that have a lower HCS priority than the serving cell, all cells that have the highest HCS_PRIO among those cells that fulfil both the criterion H>=0 and the criterion S;
     else:
       if there are cells that fulfil both the criterion H>=0 and the criterion S with an HCS priority higher or equal to the HCS priority of the serving cell:

from the cells that have an HCS priority higher or equal to the HCS priority of the serving cell, all cells that have the lowest HCS_PRIO among those cells that fulfil the criterion H>=0 and fulfil the criterion S;
    else
        all cells that fulfil the criterion S not considering HCS priority levels.

The cells shall be ranked according to the R criteria specified above, deriving $Q_{meas,n}$ and $Q_{meas,s}$ and calculating the R values using CPICH RSCP, P-CCPCH RSCP and the averaged received signal level for FDD, TDD and GSM cells, respectively.

The offset Qoffset1s,n is used for Qoffsets,n to calculate Rn, the hysteresis Qhyst1s is used for Qhysts to calculate Rs. For UE in RRC connected mode states CELL_PCH or URA_PCH the hysteresis Qhysts takes the value Qhyst1s, PCH to calculate Rs, if provided in SIB4. For UE in RRC connected mode state CELL_FACH the hysteresis Qhysts takes the value Qhyst1s,FACH to calculate Rs, if provided in SIB4.

If the usage of HCS is indicated in system information, TEMP_OFFSET1n is used for TEMP_OFFSETn to calculate TOn. If it is indicated in system information that HCS is not used, TEMP_OFFSETn is not applied when calculating Rn. The best ranked cell is the cell with the highest R value.

If a TDD or GSM cell is ranked as the best cell, then the UE shall perform cell re-selection to that TDD or GSM cell.

If an FDD cell is ranked as the best cell and the quality measure for cell selection and re-selection is set to CPICH RSCP, the UE shall perform cell re-selection to that FDD cell. If this cell is found to be not suitable, the UE shall behave accordingly.

If an FDD cell is ranked as the best cell and the quality measure for cell selection and re-selection is set to CPICH Ec/No, the UE shall perform a second ranking of the FDD cells according to the R criteria specified above, but using the measurement quantity CPICH Ec/No for deriving the Qmeas,n and Qmeas,s and calculating the R values of the FDD cells. The offset Qoffset2s,n is used for Qoffsets,n to calculate Rn, the hysteresis Qhyst2s is used for Qhysts to calculate Rs. For UE in RRC connected mode states CELL_PCH or URA_PCH the hysteresis Qhysts takes the value Qhyst2s,PCH to calculate Rs, if provided in SIB4. For UE in RRC connected mode state CELL_FACH the hysteresis Qhysts takes the value Qhyst2s,FACH to calculate Rs, if provided in SIB4. If the usage of HCS is indicated in system information, TEMP_OFFSET2n is used to calculate TOn. If it is indicated in system information that HCS is not used, TEMP_OFFSETn is not applied when calculating Rn. Following this second ranking, the UE shall perform cell re-selection to the best ranked FDD cell. If this cell is found to be not suitable, the UE shall behave accordingly.

In all cases, the UE shall reselect the new cell, only if the following conditions are met:
    the new cell is better ranked than the serving cell during a time interval Treselection. For UE in RRC connected mode states CELL_PCH or URA_PCH the interval $Treselection_{s,PCH}$ applies, if provided in SIB4, while for UE in RRC connected mode state CELL_FACH the interval $Treselection_{s,FACH}$ applies, if provided in SIB4. For hierarchical cell structures when high mobility state has not been detected, if according to the HCS rules the serving cell is not ranked then all the ranked cells are considered to be better ranked than the serving cell.

Additionally the UE shall apply the following scaling rules to $Treselection_s$ or $Treselection_{s,PCH}$ or $Treselection_{s,FACH}$:
    For intra-frequency cells and high mobility state not detected:
        no scaling applied.
    For intra-frequency cells and high mobility state is detected:
        multiply $Treselection_s$ or $Treselection_{s,PCH}$ or $Treselection_{s,FACH}$ by the IE "Speed dependent ScalingFactor for_Treselection" if sent on system information.
    For inter-frequency cells and high mobility state not detected:
        multiply $Treselection_s$ or $Treselection_{s,PCH}$ or $Treselection_{s,FACH}$ by the IE "Inter-Frequency ScalingFactor for Treselection" if sent on system information.
    For inter-frequency cells and high mobility state is detected:
        multiply $Treselection_s$ or $Treselection_{s,PCH}$ or $Treselection_{s,FACH}$ by both the IEs "Speed dependent ScalingFactor for_Treselection" if sent on system information and "Inter-Frequency ScalingFactor for Treselection" if sent on system information.
    For inter-RAT cells and high mobility state not detected:
        multiply $Treselection_s$ or $Treselection_{s,PCH}$ or $Treselection_{s,FACH}$ by the IE "Inter-RAT ScalingFactor for Treselection" if sent on system information.
    For inter-RAT cells and high mobility state is detected:
        multiply $Treselection_s$ or $Treselection_{s,PCH}$ or $Treselection_{s,FACH}$ by both the IEs "Speed dependent ScalingFactor for_Treselection" if sent on system information and "Inter-RAT ScalingFactor for Treselection" if sent on system information.
    In case scaling is applied to $Treselection_s$ or $Treselection_{s,PCH}$, the UE shall round up the result after all scalings to the nearest second. In case scaling is applied to $Treselection_{s,FACH}$, the UE shall round up the result after all scalings to the nearest 0.2 seconds.
    more than 1 second has elapsed since the UE camped on the current serving cell.

As described above, the various exemplary embodiments of the present invention relate to a method of cell selection in a hierarchical cell structure based on cell quality, which results in more efficient use of radio resources.

The present invention provides a method of cell selection for a user equipment (UE), which comprises the steps of checking whether hierarchical cell structure (HCS) is being used; reading a parameter related to an H criteria from system information; performing measurement of cells; identifying cells that satisfy an S criteria among the measured cells; checking the H criteria for a cell that satisfies the S criteria; and selecting a cell having the highest R criteria among the cells that satisfy both the S criteria and the H criteria.

The HCS defines a number of overlapping cells of different sizes that form multiple cell layers and is used if a serving cell of the UE belongs to the HCS. The S criteria is a selection or eligibility criteria used to check whether the received quality of a candidate cell is sufficient, the H criteria is a HCS criteria, used when HCS is employed, that is a positive or negative value calculated based on information sent in system information, and the R criteria is a ranking criterion used by the mobile terminal to rank the list of cells satisfying the criterion S. The measured cells are determined by performing signal measurement procedures with a base station in all searchable frequency bands, and then the cell having the strongest signal characteristics value is selected among the cells that satisfy certain cell selection conditions and access the selected cell is performed.

Also, the present invention provides a method of cell selection for a user equipment (UE), the method comprising the steps of: if hierarchical cell structure (HCS) is used in a serving cell of the UE, when the UE has low mobility, a ranking procedure is performed for all measured cells that have a highest HCS priority among those cells that fulfill a criterion S and a criterion H≧0, or the ranking procedure is performed for all measured cells regardless of HCS priorities if no cell fulfills the criterion S and the criterion H≧0; and when the UE has high mobility, the ranking procedure is performed for all measured cells, and among these measured cells, if there are cells with lower HCS priority than the serving cell that fulfills the criterion S and the criterion H≧0, then among the cells that have lower HCS priority than the serving cell, the ranking procedure is performed for all cells that have the highest HCS priority among those cells that fulfill the criterion S and the criterion H≧0, otherwise, if there are cells that fulfill the criterion S and the criterion H≧0 with a HCS priority that is higher than or equal to the HCS priority of the serving cell, then among the cells that have an HCS priority that is higher than or equal to the HCS priority of the serving cell, the ranking procedure is performed for all cells that have the lowest HCS priority among those cells that fulfill the criterion S and the criterion H≧0, else, the ranking procedure is performed for all cells regardless of HCS priorities.

The hierarchical cell structure (HCS) defines a number of overlapping cells of different sizes that form multiple cell layers. The UE is considered to have low mobility or high mobility based on the number of cell reselections during a certain time period or based on RRC signaling from the network. The measured cells are determined by performing signal measurement procedures with the base station in all searchable frequency bands, and then the cell having the strongest signal characteristics value is selected among the cells that satisfy certain cell selection conditions and access the selected cell is performed. At least one of CPICH RSCP, CPHIC Ec/N0 and Carrier RSSI is used in the signal measurement procedures.

The ranking procedure results in a ranking that shows relative signal strengths of measured cells or the extent of coverage overlap between cells, upon considering both the criterion H and criterion S when choosing candidate cells for the ranking. The ranking procedure is performed based on the R criterion and cell selection or reselection is performed on one or more cells ranked to have the best quality is performed. The HCS priority signifies defines which cell layer of the HCS the UE should be in. The HCS priority is transmitted as part of cell broadcast information in the form of system information blocks, and alternatively, for neighbor cells, the HCS priority is transmitted as part of an RRC measurement control message. The criterion S is a selection or eligibility criterion used to check whether the received quality of a candidate cell is sufficient, and the criterion H is a HCS criterion, used when HCS is employed, that is a positive or negative value calculated based on information sent in system information and on measurements from a CPICH/P-CPCCH of the candidate cell.

The various features and concepts described herein may be implemented in software, hardware, or a combination thereof. For example, a computer program (that is executed in a computer, a terminal or a network device) for a method and system for processing a method of cell selection in a hierarchical cell structure based on cell quality may comprise one or more program code sections for performing various tasks. Similarly, a software tool (that is executed in a computer, a terminal or a network device) for a method and system for processing a method of cell selection in a hierarchical cell structure based on cell quality may comprise program code portions for performing various tasks.

The method and system for processing a method of cell selection in a hierarchical cell structure based on cell quality according to the present invention are compatible with various types of technologies and standards. Certain concepts described herein are related to various types of standards, such as GSM, 3GPP, LTE, IEEE, 4G and the like. However, it can be understood that the above exemplary standards are not intended to be limited, as other related standards and technologies would also be applicable to the various features and concepts described herein.

INDUSTRIAL APPLICABILITY

The features and concepts herein are applicable to and can be implemented in various types of user devices (e.g., mobile terminals, handsets, wireless communication devices, etc.) and/or network entities that can be configured to support a method of cell selection in a hierarchical cell structure based on cell quality.

As the various concepts and features described herein may be embodied in several forms without departing from the characteristics thereof, it should also be understood that the above-described embodiments are not limited by any of the details of the foregoing description, unless otherwise specified, but rather should be construed broadly within its scope as defined in the appended claims. Therefore, all changes and modifications that fall within such scope or equivalents thereof are therefore intended to be embraced by the appended claims.

The invention claimed is:

1. A method of cell selection for a user equipment (UE), the method comprising:
   determining whether a hierarchical cell structure (HCS) is being used; and
   if the HCS is being used,
      reading a parameter related to a HCS criteria (H criteria) from system information;
      performing a measurement of cells;
      identifying cells that satisfy a selection or eligibility criteria (S criteria) among the measured cells,
      wherein the S criteria is used to check whether a reception quality of a candidate cell is sufficient;
      checking the H criteria for a cell that satisfies the S criteria; and
      selecting a cell having a highest ranking criteria (R criteria) among cells that satisfy both the S criteria and the H criteria.

2. The method of claim 1, wherein the HCS defines a number of overlapping cells of different sizes that form multiple cell layers and is used if a serving cell of the UE belongs to the HCS.

3. The method of claim 1,
   wherein the H criteria is a positive or negative value calculated based on information sent in the system information, and
   wherein the R criteria is used by the UE to rank a list of cells satisfying the S criteria.

4. The method of claim 1, wherein the measured cells are determined by performing signal measurement procedures with a base station in all searchable frequency bands, and then a cell having a strongest signal characteristics value is selected among cells that satisfy certain cell selection conditions and an access to the selected cell is performed.

5. A method of cell selection for a user equipment (UE), the method comprising:
   if a hierarchical cell structure (HCS) is used in a serving cell of the UE,
      when the UE has low mobility,
         performing a ranking procedure for all measured cells that have a highest HCS priority (criterion H) among those cells that fulfill a selection and eligibility criterion (criterion S) and a criterion $H \geq 0$, or
         performing the ranking procedure for all measured cells regardless of HCS priorities if no cell fulfills the criterion S and the criterion $H \geq 0$,
         wherein the criterion S is used to check whether a received quality of a candidate cell is sufficient; and
      when the UE has high mobility, performing the ranking procedure for all measured cells, and among these measured cells
         if there are cells with a lower HCS priority than the serving cell that fulfills the criterion S and the criterion $H \geq 0$, then among the cells that have the lower HCS priority than the serving cell, performing the ranking procedure for all cells that have a highest HCS priority among those cells that fulfill the criterion S and the criterion $H \geq 0$,
         otherwise, if there are cells that fulfill the criterion S and the criterion $H \geq 0$ with a HCS priority that is higher than or equal to the HCS priority of the serving cell, then among the cells that have the HCS priority that is higher than or equal to the HCS priority of the serving cell, performing the ranking procedure for all cells that have a lowest HCS priority among those cells that fulfill the criterion S and the criterion $H \geq 0$,
         else, performing the ranking procedure for all cells regardless of HCS priorities.

6. The method of claim 5, wherein the hierarchical cell structure (HCS) defines a number of overlapping cells of different sizes that form multiple cell layers.

7. The method of claim 5, wherein the UE is considered to have low mobility or high mobility based on a number of cell reselections during a certain time period or based on RRC (radio resource control) signaling from the network.

8. The method of claim 5, wherein the measured cells are determined by performing signal measurement procedures with a base station in all searchable frequency bands, and then a cell having a strongest signal characteristics value is selected among cells that satisfy certain cell selection conditions and an access to the selected cell is performed.

9. The method of claim 8, wherein at least one of CPICH RSCP (Common Pilot Channel Received Signal Code Power), CPHIC Ec/N0 (carrier to noise ratio) and Carrier RSSI (Received Signal Strength Indicator) is used in the signal measurement procedures.

10. The method of claim 5, wherein the ranking procedure results in a ranking that shows relative signal strengths of measured cells or an extent of coverage overlap between cells, upon considering both the criterion H and criterion S when choosing candidate cells for the ranking.

11. The method of claim 10,
   wherein the ranking procedure is performed based on a ranking criterion (R criterion), and
   wherein cell selection or reselection is performed on one or more cells ranked to have a best quality.

12. The method of claim 5, wherein the HCS priority signifies which cell layer of the HCS the UE should be in.

13. The method of claim 12, wherein the HCS priority is transmitted as part of cell broadcast information in a form of system information blocks, and alternatively, for neighbor cells, the HCS priority is transmitted as part of an RRC (radio resource control) measurement control message.

14. The method of claim 5,
   wherein the criterion H is a positive or negative value calculated based on information sent in system information and on measurements from a CPICH/P-CPCCH (Common Pilot Channel/Primary-Common Control Physical Channel) of the candidate cell.

15. The method of claim 1,
   wherein, if the HCS is used in a serving cell of the UE, then from the cells that fulfill the criterion S, performing, by the UE, a ranking of all cells that fulfill the criterion S, the ranking including:
      when the UE has low mobility,
         performing a ranking procedure for all measured cells that have a highest HCS priority among those cells that fulfill a criterion $H \geq 0$, or
         performing a ranking procedure for all measured cells regardless of HCS priorities if no cell fulfills the criterion $H \geq 0$; and
      when the UE has high mobility,
         performing the ranking procedure for all measured cells, and among these measured cells
            if there are cells with a lower HCS priority than the serving cell that fulfills the criterion $H \geq 0$, then among the cells that have the lower HCS priority than the serving cell, performing the ranking procedure for all cells that have a highest HCS priority among those cells that fulfill the criterion S and the criterion $H \geq 0$,
            otherwise, if there are cells that fulfill the criterion $H > 0$ with a HCS priority that is higher than or equal to the HCS priority of the serving cell, then among the cells that have the HCS priority that is higher than or equal to the HCS priority of the serving cell, performing the ranking procedure for all cells that have a lowest HCS priority among those cells that fulfill the criterion $H \geq 0$,
            else, performing the ranking procedure for all cells regardless of HCS priorities.

* * * * *